Patented Dec. 11, 1923.

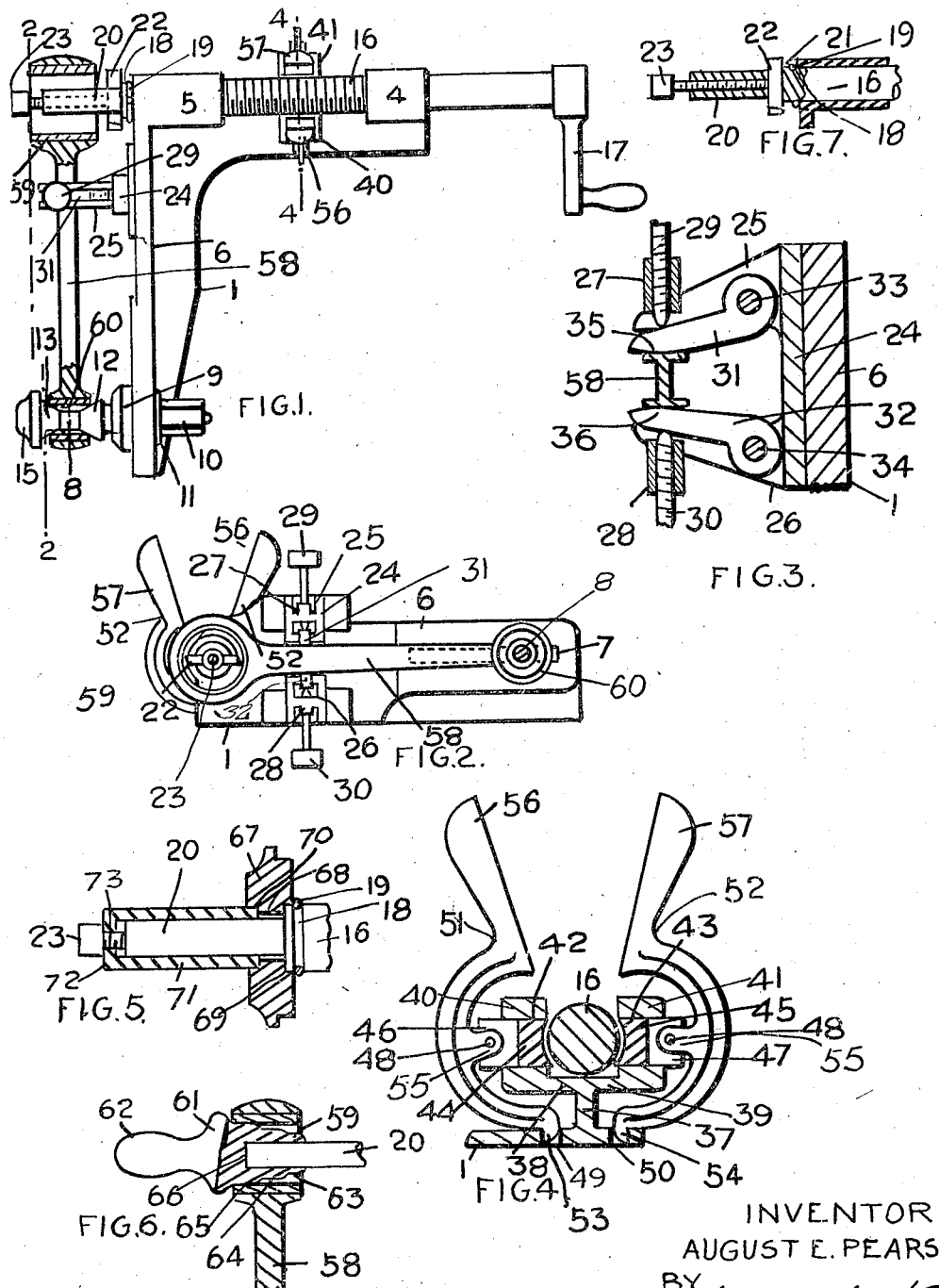

1,476,724

UNITED STATES PATENT OFFICE.

AUGUST ERIC PEARSON, OF TORONTO, ONTARIO, CANADA.

BORING MACHINE.

Application filed November 26, 1921. Serial No. 517,937.

*To all whom it may concern:*

Be it known that I, AUGUST ERIC PEARSON, a citizen of the United States of America, of the city of Toronto, in the county of York, in the Province of Ontario, Canada, have invented certain new and useful Improvements in Boring Machines, of which the following is the specification.

My invention relates to improvements in boring machines, and the object of the invention is to devise a small, compact and portable machine which is adaptable for use by individuals where machines such as are used in large shops are unavailable and it is particularly adapted for boring out the babbitted bearings of a link rod so as to true it up accurately and accurately centre the hole, and it consists essentially of the arrangement and construction of parts as hereinafter more particularly explained.

Fig. 1 is a plan view of my boring machine showing a link rod in position ready for boring, the upper portions of the link being broken away and in section.

Fig. 2 is a sectional elevation of my machine showing a link rod in position and taken on line 2—2, Fig. 1.

Fig. 3 is an enlarged sectional detail of the link holding means.

Fig. 4 is a cross sectional view on line 4—4, Fig. 1.

Fig. 5 is a sectional detail view showing a means for securing a facing tool to the feed spindle of my machine.

Fig. 6 is a sectional detail showing a portion of a link rod and a means for centering it in position before it is finally clamped in such position.

Fig. 7 is a sectional view of a portion of the feed spindle showing the means for securing the cutting tool in position therein.

In the drawings like characters of reference indicate corresponding parts in each figure.

1 indicates the base of my machine which is substantially right angular in form and provided with sleeve bearings 4 and 5 extending upwardly from one arm of the right angular base.

6 is a flange which extends upward from the outer edge of the other arm of the base, such flange extending from the bearing 5 to the extreme end of the arm. The outer end of the flange is provided with a longitudinal slot 7. 8 is a pin provided with an enlargement 9 which fits against the outer face of the flange 6, the inner portion of the pin extending through the slot 7, such portion being threaded and provided with a nut 10 having a flange 11 which bears against the opposite face of the flange 6, so that the flange 6 is clamped between the flange 11 and the enlargement 9.

12 is a conical member which is carried upon the pin 8. 13 is a similar member which is also carried upon the pin 8 so as to oppose the conical member 12, the member 13 being forced towards the member 12 by means of a nut 15 which is screwed upon the outer edge of the pin for a purpose which will hereinafter appear. 16 is my feed spindle, a major portion of which is unthreaded, the unthreaded portions normally extending through the bearings 4 and 5 and the threaded portion between the bearings 4 and 5.

The outer end of the spindle is provided with an operating crank handle 17. The opposite end of the spindle 16 is provided with an annular groove 18 in which is sprung a split ring 19 which acts as an annular shoulder forming a stop to prevent the withdrawal of the spindle 16 through the bearings 4 and 5. The spindle 16 is provided with a reduced extension 20 in which is formed a cross slot 21 through which extends the cutting tool 22. The cutting tool 22 is clamped within the slot by means of a set screw 23 which extends longitudinally through the centre of the spindle so as to bear at its inner end against the side of the cutting tool 22.

Intermediately between the bearing 5 and the longitudinal slot 7 is secured upon the flange 6 a bracket 24. The bracket 24 is provided with an upper pair of arms 25 spaced apart and a lower pair of arms 26 also spaced apart, the outer ends of the members of the arm 25 being connected together by a vertical internally threaded bearing 27 and the members of the arms 26 by a similar bearing 28.

29 is a set screw which is screwed into the bearing 27, and 30 is a set screw which is screwed into the bearing 28. 31 and 32 are jaws which are pivotally mounted upon pins 33 and 34 extending through the arms 25 and 26. The opposing inner edges of the jaws 31 and 32 are curved as indicated at 35 and 36, such curved portions being suitably knurled.

37 is a flange which extends upwardly from the base 1 between the bearings 4 and 5.

38 and 39 are arms extending outwardly from each side of the flange 37, such arms being provided with upward extensions 40 and 41 in which are located orifices 42 and 43. 44 and 45 are blocks slidably held in the orifices 42 and 43, the inner faces of the blocks being concaved on an arc concentric to the centre of the feed spindle 16, such concaved faces being threaded to correspond to the thread of the feed spindle so as to engage therewith.

The blocks 44 and 45 are provided with vertical recesses 46 and 47 through each of which extends a pin 48.

49 and 50 are orifices formed in the base at each side of the flange 37. 51 and 52 are levers, the lower ends of which are provided with tongue portions 53 and 54, the inner opposing edges of which are convex as will be clearly seen on referring to Fig. 4. The levers 51 and 52 curve upwardly and outwardly around the flange extensions 40 and 41, each of such curved portions being provided intermediately of its length with a lug 55 which extends into a corresponding recess 46 and 47 and is pivoted upon the pin 48 as hereinafter described.

The upper ends of the levers 51 and 52 are provided with handle portions 56 and 57. 58 is a link rod of ordinary construction provided with the usual babbitted end bearings 59 and 60. 61 is a plug provided with a handle 62, the body of the plug being tapered, the tapered portion being formed with annular steps 63, 64 and 65 so as to fit different sizes of bearings. The centre of the plug is provided with a longitudinal recess 66 into which the reduced end of the feed spindle 16 fits.

Having described the principal parts involved in my invention will briefly describe the operation of the same.

In order to secure the link 58 in the proper position in my machine, I first insert the plug 61 into the bearing 59 so that one of the annular steps of the plug fits the bearing.

I then withdraw the set screw 23 and insert the end of the feed spindle into the central recess of the plug 61.

By this means the end of the link is accurately centered in position. The arm of the link is passed between the jaws 31 and 32 and the set screws 29 and 30 are screwed against the jaws 31 and 32 forcing them against the upper and lower edges of the link 58 clamping it securely in position.

Simultaneously with the fitting of the plug 61 upon the end of the feed spindle 16 the outer end of the pin 8 is passed through the bearing 60 of the link after the nut 15 and conical member 13 have been removed therefrom.

As soon the link is clamped in position by means of the jaws 31 and 32 the conical member 13 is reinserted in position and the nut screwed into place thereby securely clamping that end of the link between the conical members 13 and 12. When this operation is completed the plug 61 is withdrawn and the set screw 23 reinserted so as to clamp the cutting tool 22 in the desired position.

As soon as this is accomplished the operator grips the handles 56 and 57 in one hand so as to force them together carrying the threaded concave faces of the blocks 44 and 45 into engagement with the feed spindle 16. The crank handle 17 is then turned by the other hand of the operator, the feed spindle 16 gradually feeding forward between the blocks 44 and 45, carrying the cutting tool 22 into the babbitted bearing 59.

As the cutting tool travels forward, it cuts away the inner surface of the babbitt so as to provide a perfectly accurate and finished surface which is perfectly true at all points. When the cutting operation is completed the handles 56 and 57 are released, the levers 51 and 52 falling outward by gravity, carrying the blocks 46 and 47 out of engagement with the spindle 16.

The feed spindle 16 is then pulled longitudinally back to its normal position. After the babbitted bearing has been trued as above set forth, the edges of the babbitt are trimmed off by a facing tool such as indicated at 67.

This cutting tool is provided with a central orifice 68 through the feed spindle extends, the inner end of the orifice being provided with an annular recess 69 into which the end of the main portion of the feed spindle 16 fits.

The opposite end of the orifice 68 is provided with an annular recess 70. 71 is a sleeve provided with a closed end 72 having an orifice 73 through which the set screw 23 extends. When securing the facing tool 67 in position it is slipped on to the feed spindle so that the recess 68 receives the end of the main portion of the spindle. The set screw 23 is then removed and the sleeve 71 slipped onto the outer end of the feed spindle so that its inner end fits into the recess 70. The set screw is then replaced thereby clamping the cutting tool 67 between the inner end of the sleeve 71 and the outer end of the main portion of the feed spindle 16. The machine is then operated as before described.

From this description it will be seen that I have devised a very simple, cheap device by which babbitted link rod bearings may be accurately trued, and such a device as is available to any individual who is desirous of doing this work.

What I claim as my invention is:

1. In a boring machine a base comprising two arms set horizontally at right angles one to the other, a pair of longitudinally aligned bearings extending upward from one arm, a cutter shaft freely supported within the bearings and normally free to slide longitudinally and having a threaded portion located between the bearings, a pair of gripping levers extending at each side of such threaded portion and held normally out of engagement therewith and pivotally engaging the base at their lower ends, guides also extending at each side of the threaded portion of the shaft and forming part of the base, thread engaging members movable in the aforesaid guides and connected to the levers to be carried into and out of their thread engaging position, and means extending from the other arm of the base for carrying a link to be operated on by the cutter.

2. In a boring machine, the combination with a base and a link supporting flange extending therefrom, of a pair of narrow fingers pivotally carried by and extending from the supporting flange above and below the link and having arc shaped opposing portions at their outer ends flaring away one from the other, pressure screws for forcing the finger end portions against the link stem in proximity to the large head of the link, and means extending through the small head of the link and coacting with the fingers for holding the link in correct horizontal alignment.

3. In a boring machine, the combination with a base and link supporting flange and cutter shaft, and means extending through the small head of a link for supporting one end of the link, a centering plug extending into and fitting the large head of the link and having a central recess into which the cutter shaft end fits, and gripping fingers carried by the supporting flange of the base adapted to grip the link closely adjacent to the large head.

4. In combination, a base having arms set horizontally, smooth bore bearings extending upward from one arm, a longitudinal flange extending upward from the other arm, a cutter shaft slidable freely in the aforesaid bearings and having a threaded portion, means engaging the base contractable when grasped by the hand of the operator for engaging the thread of the shaft, and means extending from the flange for supporting the link with the large end in central alignment with the end of the cutter shaft.

5. In a boring machine, a base, a pair of longitudinally aligned stationary bearings carried by the base, a cutter shaft freely supported within the bearings and normally free to slide longitudinally and having a threaded portion adapted to slide freely through the bearings, a pair of gripping levers extending at each side of such threaded portion and held normally out of engagement therewith and adapted to engage the thread at diametrically opposite sides of the shaft when manually drawn together and to automatically free the shaft for longitudinal movement when released, means for rotating the shaft, and work holding means adapted to hold the work having a circular orifice in substantial axial alignment with the aforesaid shaft.

6. In a boring machine, a base, a pair of longitudinally aligned stationary bearings carried by the base, a cutter shaft freely supported within the bearings and normally free to slide longitudinally and having a threaded portion adapted to slide freely through the bearings, a pair of gripping levers extending at each side of such threaded portion and held normally out of engagement therewith and pivotally engaging the base at their lower ends and adapted to engage the thread at diametrically opposite sides of the shaft when manually drawn together and to automatically free the shaft for longitudinal movement when released, a crank handle mounted directly upon the cutter shaft, and work holding means adapted to hold the work having a circular orifice in substantial axial alignment with the aforesaid shaft.

AUGUST ERIC PEARSON.